(12) United States Patent
Morimoto

(10) Patent No.: US 8,755,128 B2
(45) Date of Patent: Jun. 17, 2014

(54) IMAGE PICKUP LENS, IMAGE PICKUP APPARATUS, AND LENS CONTROLLING METHOD

(75) Inventor: Yosuke Morimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 13/051,546

(22) Filed: Mar. 18, 2011

(65) Prior Publication Data

US 2011/0235188 A1 Sep. 29, 2011

(30) Foreign Application Priority Data

Mar. 26, 2010 (JP) ................... 2010-071632

(51) Int. Cl.
  *G02B 15/14* (2006.01)
  *H04N 5/262* (2006.01)
  *H04N 5/232* (2006.01)
  *G02B 7/10* (2006.01)

(52) U.S. Cl.
  CPC ............ *G02B 7/102* (2013.01); *H04N 5/23296* (2013.01)
  USPC .......... 359/697; 348/240.3; 348/345

(58) Field of Classification Search
  CPC ............ G02B 7/102; H04N 5/23296; H04N 5/23212; G01D 3/022
  USPC ................. 359/383, 697, 694, 695, 696, 701; 348/346, 347, 352, 357, 240.3, 345, 348/349; 396/76, 79, 87, 280, 291, 298, 396/290, 80, 81, 82, 85, 77; 324/207.12, 324/207.21, 207.24
  See application file for complete search history.

(56) References Cited

U.S. PATENT DOCUMENTS 5,930,054 A * 7/1999 Kasuya .......................... 359/698
5,973,857 A * 10/1999 Kaneda .......................... 359/701
7,013,082 B2 * 3/2006 Kaneda et al. .................. 396/85

(Continued)

FOREIGN PATENT DOCUMENTS

CN 1743987 A 3/2006
CN 101034196 A 9/2007

(Continued)

OTHER PUBLICATIONS

European Search Report issued on Dec. 29, 2011, that issued in the corresponding European Patent Application No. 11159134.3.

(Continued)

*Primary Examiner* — David N Spector
(74) *Attorney, Agent, or Firm* — Cowan, Liebowitz & Latman, P.C.

(57) ABSTRACT

An image pickup lens includes a controller and a manipulator position detector configured to detect a position of a manipulator configured to accept a manipulation used to move the lens. When the manipulation of the manipulator becomes valid and a difference between the position of the manipulator when the manipulation of the manipulator is invalid and the position of the manipulator when the manipulation of the manipulator is valid is equal or smaller than a threshold, the controller controls a movement of the lens from an initial position that is the position of the lens when the manipulation of the manipulator is invalid. When the manipulation of the manipulator becomes valid and the difference is larger than the threshold, the controller controls a movement of the lens from an initial position that is the position of the lens corresponding to the manipulator's position detected by the manipulator position detector.

24 Claims, 9 Drawing Sheets

(56) References Cited

U.S. PATENT DOCUMENTS

| | | | |
|---|---|---|---|
| 7,423,685 B2 * | 9/2008 | Morimoto | 348/347 |
| 7,444,076 B2 * | 10/2008 | Kushida | 396/259 |
| 7,571,807 B2 * | 8/2009 | DeBusk et al. | 206/435 |
| 7,589,768 B2 * | 9/2009 | Morimoto | 348/240.1 |
| 7,852,568 B2 * | 12/2010 | Morimoto | 359/697 |
| 8,526,804 B2 * | 9/2013 | Morimoto | 396/77 |
| 2006/0290800 A1 * | 12/2006 | Ohkawa | 348/335 |
| 2007/0212048 A1 * | 9/2007 | Morimoto | 396/85 |
| 2011/0115968 A1 * | 5/2011 | Yamanaka | 348/357 |

FOREIGN PATENT DOCUMENTS

| | | | |
|---|---|---|---|
| EP | 1631065 A2 | 3/2006 |
| JP | 09-243899 A | 9/1997 |
| JP | 2004-233892 | 8/2004 |
| JP | 2006-065238 A | 3/2006 |

OTHER PUBLICATIONS

Jan. 11, 2013 Chinese Office Action, with English Translation, that issued in Chinese Patent Application No. 201110078841.0.

Korean Office Action issued on May 30, 2013, without an English Translation, that issued in the corresponding Korean Patent Application No. 10-2011-0024727.

* cited by examiner

IMAGE PICKUP LENS, IMAGE PICKUP APPARATUS, AND LENS CONTROLLING METHOD

BACKGROUND OF THE INVENTION

1. Field of the Invention

The present invention relates to an image pickup lens, an image pickup apparatus, and a lens controlling method.

2. Description of the Related Art

So-called power zoom/power focus mechanisms use a lens driving motor to electrically control lens actions and have recently been frequently used as means for moving the lens in accordance with photographer's manipulations. In this case, an electronic ring that serves as a manipulator and a volume key or the like configured to measure a manipulation amount are provided, and an electronic signal is output in accordance with the manipulation amount. Zooming and focusing can be realized by controlling the lens driving motor in accordance with the electric signal.

Japanese Laid-Open Patent Application No. ("JP") 2004-233892 discloses an image pickup apparatus configured to drive a magnification variable lens using a magnification variable ring and a zoom key, and to use a potentiometer as a position detector of the magnification variable ring. JP 2004-233892 provides a motor configured to drive the magnification variable ring and a sensor configured to detect whether the magnification variable ring is located at the reference position, detects the output voltage of the potentiometer when the magnification variable ring is located at the reference position, and corrects fluctuations caused by temperature drift.

For example, assume that the photographer fixes the image pickup apparatus on a tripod, sets the magnification and focusing of the lens utilizing a zoom ring and a focus ring, and then turns off the power of the image pickup apparatus. Later on, when the power of the image pickup apparatus is turned on, it is convenient that the lens is located at the same position as the previous position.

However, when the focal length indication of the zoom ring does not correspond to the position of the variator lens unit, JP 2004-233892 drives the zoom motor in a direction of eliminating the difference. Therefore, when the output of the position of the zoom ring fluctuates due to the above temperature changes, the lens position shifts. This positional shift occurs when the manipulation of the manipulator switches from an invalid state to a valid state, etc. in addition to power switching from the turning-off state to the turning-on state.

In addition, the detecting accuracy of the potentiometer degrades due to the influence of electric noises. As a result, the positioning accuracy of the lens calculated from the detection result of the potentiometer degrades, and the lens position cannot be accurately calculated or shifts.

SUMMARY OF THE INVENTION

An image pickup lens or image pickup apparatus according to the present invention includes a lens position detector configured to detect a position of a lens, a manipulator position detector configured to detect a position of a manipulator configured to accept a manipulation used to move the lens, and a controller. When power becomes turned on or the manipulation of the manipulator becomes valid and when a difference between the position of the manipulator when the power is turned off or the manipulation of the manipulator is invalid and the position of the manipulator when the power becomes turned on or the manipulation of the manipulator becomes valid is equal to or smaller than a threshold, the controller is configured to control the movement of the lens from an initial position that is the position of the lens detected by the lens position detector when the power is turned off or the manipulation of the manipulator is invalid. When power becomes turned on or the manipulation of the manipulator becomes valid and when the difference is larger than the threshold, the controller is configured to control the movement of the lens from an initial position that is the position of the lens which corresponds to the position of the manipulator detected by the manipulator position detector.

Further features of the present invention will become apparent from the following description of exemplary embodiments with reference to the attached drawings.

DESCRIPTION OF THE EMBODIMENTS

A description will be given of a variety of embodiments of the present invention with reference to the accompanying drawings.

First Embodiment

Figure 1:
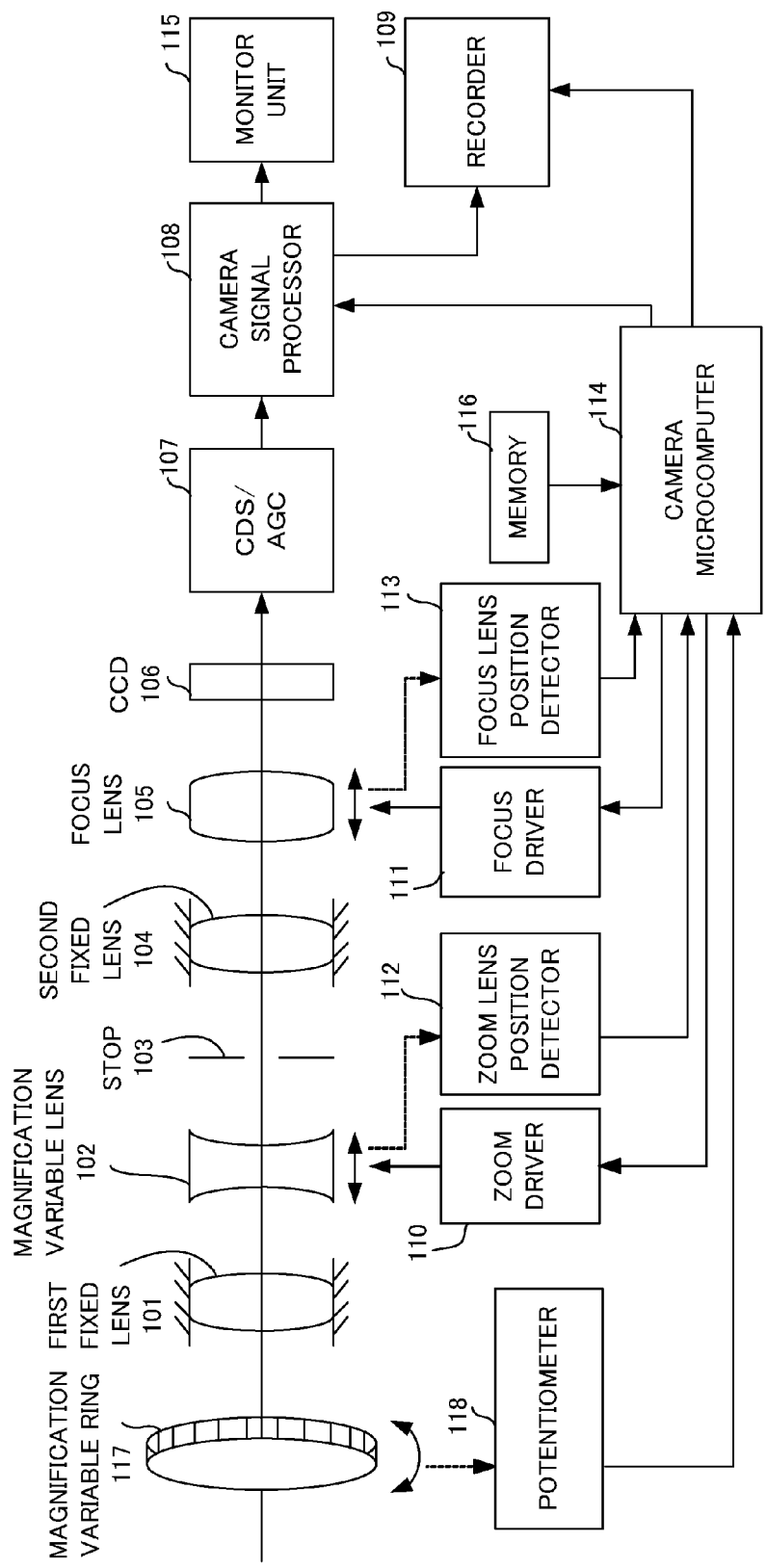
FIG. 1 is a block diagram of an image pickup apparatus according to a first embodiment.

FIG. 1 is a block diagram of an image pickup apparatus according to a first embodiment. In the first embodiment, the image pickup lens is integrated with the image pickup apparatus.

In FIG. 1, reference numeral 101 denotes a first fixed lens unit, reference numeral 102 denotes a variator lens unit for magnification variations (referred to as a "magnification variable lens (zoom lens)" hereinafter), reference numeral 103 denotes a stop, and reference numeral 104 denotes a second fixed lens unit. Reference numeral 105 denotes a focusing lens configured to provide focusing on an object, and more specifically a lens unit (referred to as a "focus lens" hereinafter) which has a so-called compensation function that includes a focusing function and a zoom tracking function used to correct a movement of a focal plane.

The magnification variable lens 102 is configured movable in an optical axis direction by a zoom driver 110, and the focus lens 105 is configured movable in the optical axis direction by a focus driver 111. These drivers may use a stepping motor or a direct acting voice coil motor.

The position of the magnification variable lens 102 is detected by a zoom lens position detector 112, and the position of the focus lens 105 is detected by a focus lens position detector 113. When the driver is a stepping motor, the lens position detector may be an input pulse count from a reference reset position. At this time, a position detector configured to detect a reference position may use, for example, a photo-interrupter configured to detect as a reference position a boundary position light-shielded by a shield wall integrally provided with a movable lens frame. Furthermore, the position detector may use a magnetoresistance (MR) device configured to detect a magnetic change of a magnetic scale integrally provided with the movable lens frame.

Input light from an object forms an image on an image pickup device 106 through the optical system that includes the lens units 101 to 105. The image pickup device 106 is a photoelectrical conversion element, such as a CCD and a CMOS, and is configured to convert an object image into a video signal as an electric signal. The video signal is read out and amplified by a CDS/AGC circuit 107, and input into a camera signal processor 108.

The camera signal processor 108 provides image processing, and converts an input signal into a signal corresponding to a recorder 109 and a monitor unit 115. The recorder 109 is configured to record an object image into a recording medium, such as a magnetic tape, an optical disc, and a semiconductor memory. The monitor unit 115 displays an object image on an electronic viewfinder, a liquid crystal panel, etc.

The camera microcomputer (camera MC) 114 is a controller (processor) configured to control the entire image pickup apparatus, and to control the camera signal processor 108 and the recorder 109, etc. Information on the position of the magnification variable lens 102 detected by the zoom lens position detector 112 and the position of the focus lens 105 detected by the focus lens detector 113 is input into the camera MC 114, and used to drive these lenses.

The camera MC 114 controls the zoom driver 110 and the focus driver 111 in accordance with the processing result of the lens driving control, and thereby controls the lens. The camera MC 114 controls driving of the magnification variable lens 102 in accordance with an output of a potentiometer 118, which will be described later.

Reference 116 denotes a memory, such as a volatile DRAM, a nonvolatile SRAM, and a flash ROM. The memory 116 stores a program of processing performed by the camera MC 114, and data used for the processing. The memory 116 stores as a previous position, for example, a position of the magnification variation ring 117 or a position of the magnification variable lens 102 when the power is turned off.

The magnification variable ring 117 is a manipulator that is manipulated by a photographer in manual zooming, and rotatably provided onto a fixed barrel (not illustrated) of the optical system in the image pickup apparatus in this embodiment.

This embodiment discusses in an example the magnification variable ring 117 that serves as a manipulator manipulated by the photographer so as to move the lens. However, this discussion is applicable to another manipulator, such as a focus ring used to operate the focus lens 105 or two independent manipulation rings for zooming and focusing. In this case, the manipulation range of the focus ring is physically restricted similar to the magnification variable ring, which will be described later. In addition, the manipulator does not necessarily have a ring shape, and may be an input member having another shape as long as it can designate the position of the lens.

The magnification variable ring 117 of this embodiment is an absolute value type electronic ring in which its rotation center accords with the optical center (optical axis) of the above optical system, and a manipulation amount by the photographer is converted into an electronic signal.

In this embodiment, the camera MC 114 provides controls so as to move the magnification variable lens 102 in the telephoto side when the magnification variable ring 117 is rotationally manipulated so as to increase its angle.

A rotationally manipulatable range of the magnification variable ring 117 is physically restricted by a mechanical contact between a telephoto end stopper located at the telephoto end in which the focal length (zoom position) becomes the longest focal length, and a wide angle end stopper located at the wide angle end in which it becomes the shortest focal length. The rotationally manipulatable range of magnification variable ring 117 is set, for example, between 60° and 90°.

Reference numeral 118 denotes a manipulator position detector configured to detect an absolute position (rotating angle) of the magnification variable ring 117 as the manipulator, and is a potentiometer having a multi-rotation type configured to output a position detection signal. The potentiometer 118 is associatively driven via a gear unit and an inner gear provided in the magnification variable ring 117, and configured to output a (position detecting) signal corresponding to the position of the magnification variable ring 117.

The output of the potentiometer 118 is connected into the A/D conversion input unit provided in the camera MC 114. The camera MC 114 calculates the corresponding position of the magnification variable lens 102 based on the output of the potentiometer 118.

Figure 2A:
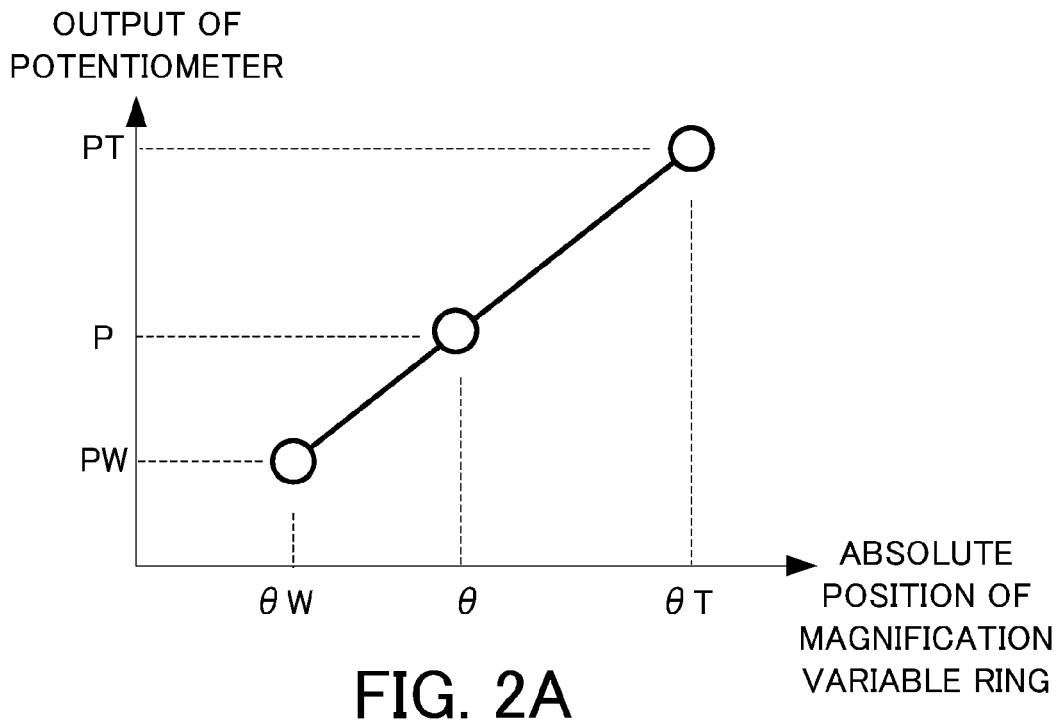
FIGS. 2A and 2B are graphs illustrating a relationship among an absolute position of a magnification variable ring, an output of a potentiometer, and a position of a magnification variable lens illustrated in FIG. 1.
Figure 2B:
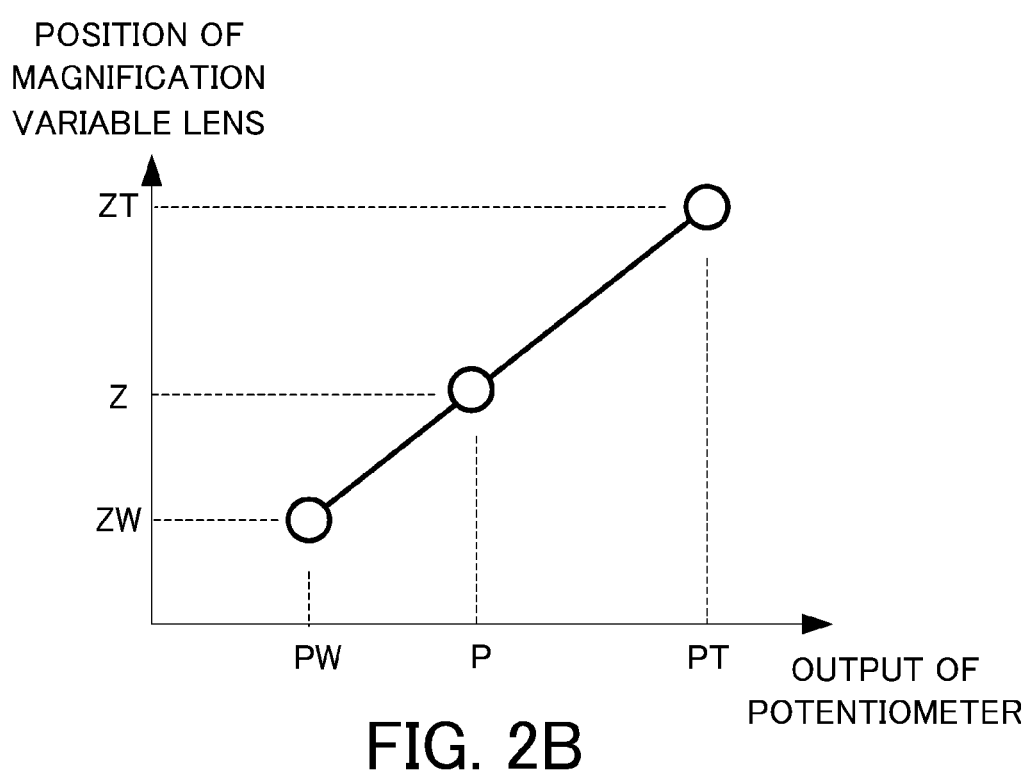

Next follows a description of calculation processing of the position of the magnification variable lens 102 executed by the camera MC 114, with reference to FIGS. 2A and 2B.

FIG. 2A is graph illustrating a relationship between an absolute position of the magnification variable ring 117 and an output of the potentiometer 118. Assume that the potentiometer 118 exhibits an output PW when the magnification variable ring 117 is located at a wide angle end stopper position θW and an output PT when the magnification variable ring 117 is located at a telephoto end stopper position θT. The values of PW and PT are previously measured, for example, when the image pickup apparatus is assembled, and stored as nonvolatile data in the memory 116. FIG. 2A illustrates the potentiometer 118 has an output P when the magnification variable ring 117 has an absolute value θ.

FIG. 2B is a graph illustrating a relationship between an output of the potentiometer 118 and a position of the magnification variable lens 102. When the potentiometer 118 has the output PW, the magnification variable lens 102 is located at an optical wide angle end ZW, and when the potentiometer 118 has the output PT, the magnification variable lens 102 is located at an optical telephoto end ZT. Thereby, the position of the magnification variable lens 102 can be controlled in accordance with the absolute position of the magnification variable ring 117, and the manipulation sense is similar to that of the magnification variable ring using a mechanical cam mechanism. A position Z of the magnification variable lens 102 when the output of the potentiometer 118 has the output P can be calculated as follows:

$$Z = G \times (P - PW) + ZW \quad (1)$$

G is a value determined by the following expression, and represents a slope of a line of FIG. 2B:

$$G=(ZT-ZW)/(PT-PW) \tag{2}$$

Figure 3A:
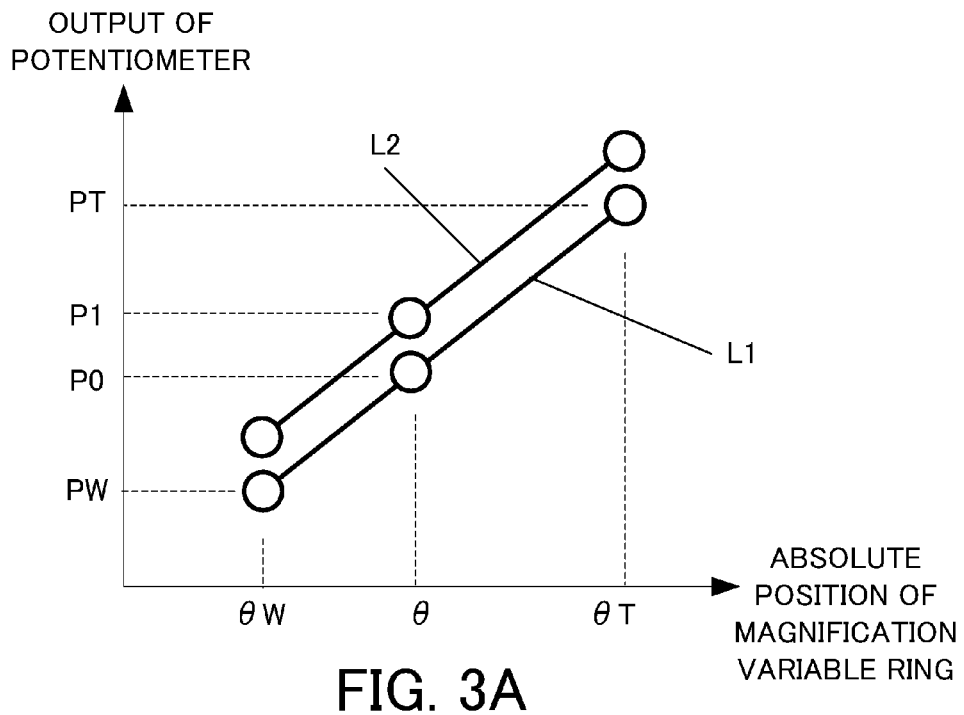
FIGS. 3A and 3B are graphs illustrating a relationship among an absolute position of a magnification variable ring, an output of a potentiometer, and a position of a magnification variable lens illustrated in FIG. 1 when the power is turned off and when the power is turned on in the image pickup apparatus.
Figure 3B:
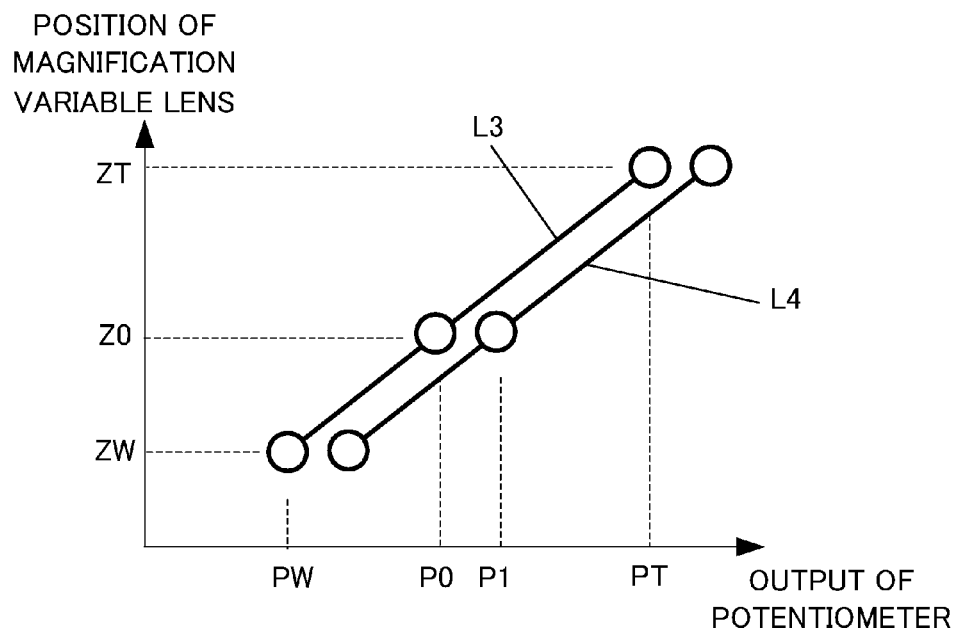

Referring now to FIGS. 3A and 3B, a description will be given of processing of determining an initial position of the magnification variable lens 102 when the power is turned on, based on the position of the magnification variable ring 117 and the position of the magnification variable lens 102 stored when the power is turned off.

Similar to FIG. 2A, FIG. 3A is a graph illustrating a relationship between an absolute position of the magnification variable ring 117 and an output of the potentiometer 118. L1 denotes a state before the power is turned off, and L2 denotes a state after the power is turned on later. Since L1 is different from L2 due to the temperature drift, the output of the potentiometer 118 has an output P0 before the power is turned off and an output P1 when the power is turned on when the absolute value of the magnification variable ring 117 is θ, and the outputs P0 and P1 are different from each other. When the position Z of the magnification variable lens 102 is found based on Expression 1 at this state, the output of the potentiometer 118 shifts by a change from P0 to P1.

Similar to FIG. 2B, FIG. 3B is a graph illustrating a relationship between the output of the potentiometer 118 and the position of the magnification variable lens 102. L3 denotes a state before the power is turned off, and the magnification variation position is Z0 when the potentiometer 118 has the output P0. After the power is turned on later, the output of the potentiometer 118 becomes P1 but the position of the magnification variable lens 102 needs to remain Z0 since the position θ of the magnification variable ring 117 does not change as illustrated in FIG. 3A.

In other words, a relationship between the output of the potentiometer 118 and the position of the magnification variable lens 102 may become L4 after the power is turned on. Here, changes of a slope G of the line is micro even when temperature drift occurs. Therefore, by utilizing the fact that the output P1 of the potentiometer 118 corresponds to the position Z0 of the magnification variable lens 102, the position Z of the magnification variable lens 102 can be found by utilizing the following expression when the output of the potentiometer 118 is P. Thereby, the position of the magnification variable lens 102 can be calculated in accordance with the relationship of L4:

$$Z=G\times(P-P1)+Z0 \tag{3}$$

In the lens driving control of this embodiment, the output P0 of the potentiometer 118 before the power is turned off and the position Z0 of the magnification variable lens 102 at this time are stored as nonvolatile data in the memory 116. When the power is turned on next time, the camera MC 114 compares the output P1 of the potentiometer 118 with the stored data P0.

When a difference between P1 and P0 is equal to or smaller than a threshold determined by the detecting accuracy that is determined by considering the temperature drift and the electric noises, the position θ of the magnification variable ring 117 can be regarded as the previous position. Therefore, the stored position Z0 of the magnification variable lens 102 is used as an initial position, and a later position of the magnification variable lens 102 is controlled in accordance with Expression 3. On the other hand, when the difference between P0 and P1 is larger than the threshold, the magnification variable ring 117 can be considered to have rotated, and the initial position of the magnification variable lens 102 and a later position of the magnification variable lens 102 are controlled in accordance with Expression 1.

In Expressions 1 and 3, PW corresponds to P1 and ZW corresponds to Z0. Therefore, the calculation of the position of the magnification variable lens 102 can be switched in the initialization processing when the comparison with the threshold is made, by determining whether a pair of PW and ZW or a pair of P1 and Z0 is used as parameters of the calculational processing of the position Z of the magnification variable lens 102.

The lens movement control processing will be described with reference to the flowcharts illustrated in FIGS. 4 and 5.

Figure 4:
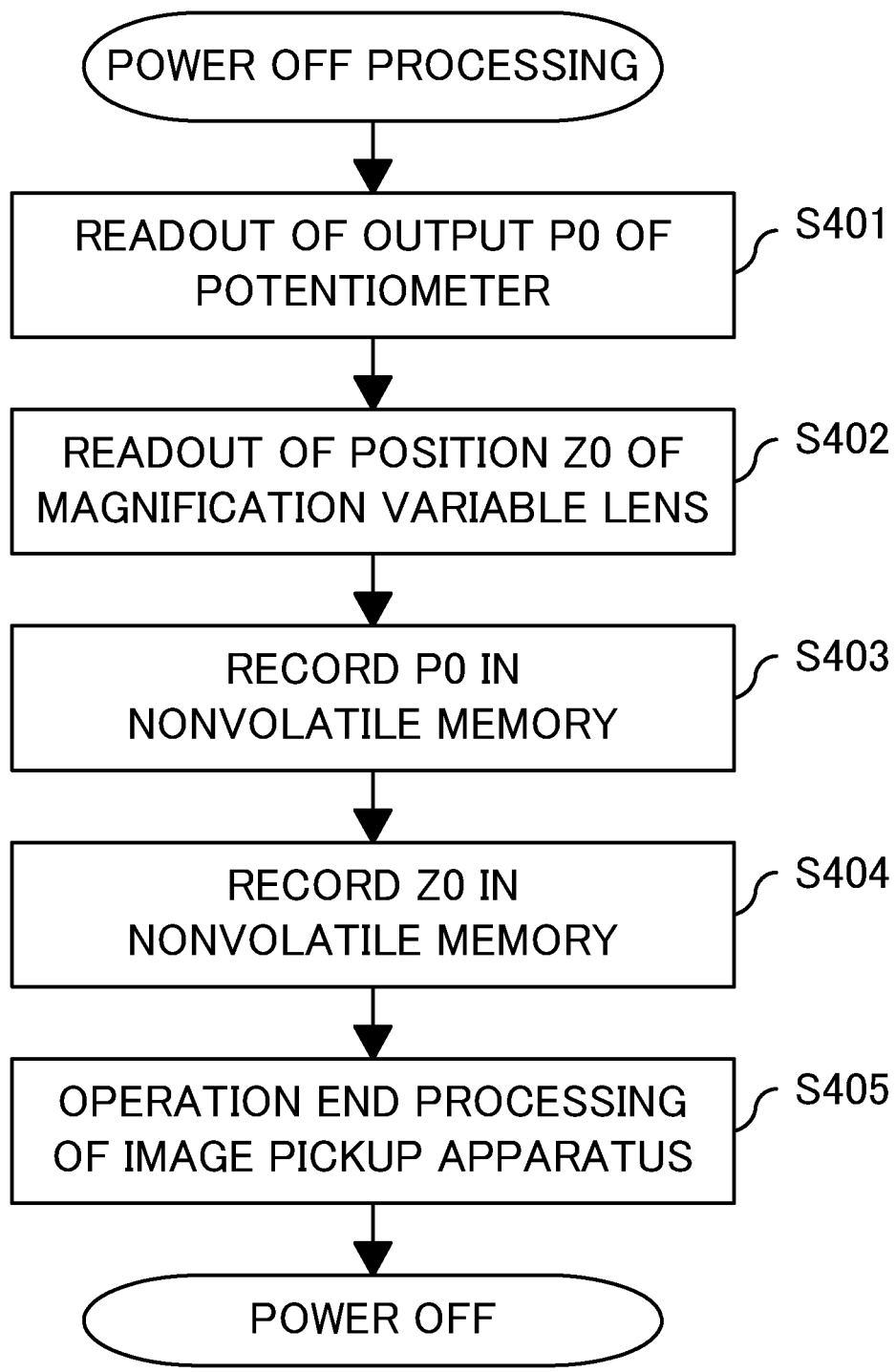
FIG. 4 is a flowchart for explaining a control method when the power is turned off in the image pickup apparatus.

FIG. 4 is a flowchart illustrating the lens driving control (lens control method) executed by the camera MC 114 when the power is turned off, and "S" stands for the step.

In S401, the camera MC 114 reads out the output P0 of the potentiometer 118 from the A/D conversion input unit (or detects the position of the magnification variable ring 117 as the manipulator). Next, in S402, the camera MC 114 reads out the position Z0 of the magnification variable lens 102 from the zoom lens position detector 112 (or detects the position of the magnification variable lens 102).

In S403 and S404, the camera MC 114 stores data of P0 and Z0 in the nonvolatile memory 116.

In S405, the camera MC 114 executes general operation ending processing for the image pickup apparatus, and turns off the power.

Figure 5:
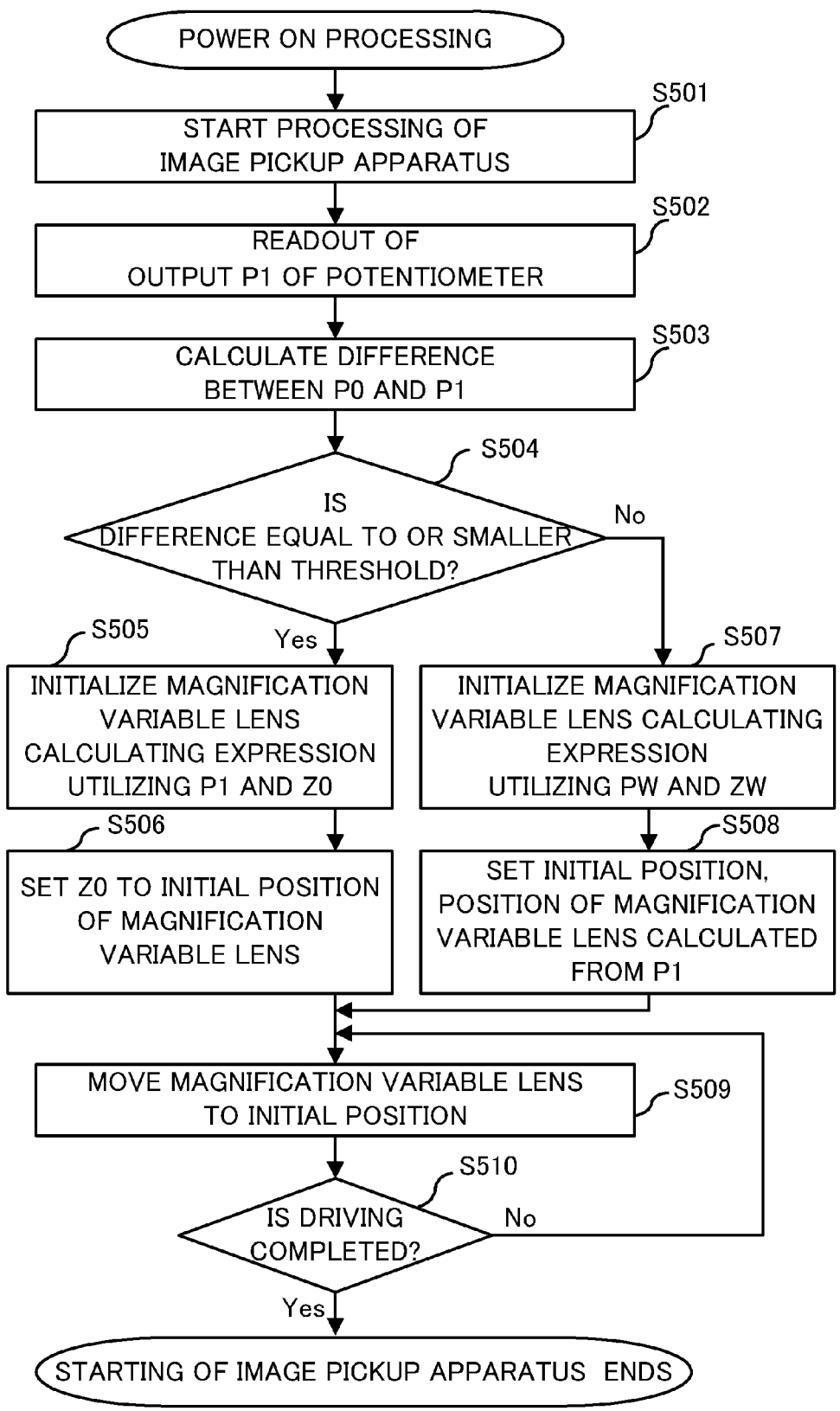
FIG. 5 is a flowchart for explaining a control method when the power is turned on in the image pickup apparatus.

FIG. 5 is a flowchart illustrating the lens control method executed by the camera MC 114 when the power is turned on and "S" stands for the step.

S501 denotes general starting processing of the image pickup apparatus. In S502, the camera MC 114 reads out the output P1 of the potentiometer 118 when the power is turned on. In S503, the camera MC 114 reads out the potentiometer output P0 when the power is turned off, which is the previous position stored in the nonvolatile memory in S403, and calculates a difference between P0 and P1.

Next, in S504, the camera MC 114 determines whether the calculated difference is equal to or smaller than the threshold determined by the detecting accuracy of the potentiometer 118. When the camera MC 114 determines that the difference is equal to or smaller than the threshold, the flow moves to S505 and the camera MC 114 performs initialization processing that determines to use P1 and Z0 as parameters for operational expressions so as to utilize Expression 3 to calculate the subsequent lens position.

Next, in S506, the camera MC 114 sets as the initial position of the magnification variable lens 102 when the image pickup apparatus is started, the position Z0 of the magnification variable lens 102 when the power is previously turns off, which is stored in the nonvolatile memory in S404, and the flow moves to S509.

On the other hand, when the camera MC 114 determines that the difference between P0 and P1 is larger than the threshold in S504, the flow moves to S507. In S507, the camera MC 114 performs initialization processing that determines to use the PW (corresponding to the wide angle end stopper position θW of the magnification variable ring 117) and ZW (corresponding to the optical wide angle end ZW of the position of the magnification variable lens 102) for the parameters of the operational expressions so as to utilize Expression 1 to calculate the subsequent lens position. Next, in S508, the camera MC 114 sets as the initial position of the magnification variable lens 102 when the image pickup apparatus is started, the position of the magnification variable lens 102 calculated from the Expression 1 and the output P1 of the potentiometer 118 read in S502, and the flow moves to S509.

In S509, the camera MC 114 controls the zoom driver 110 so as to drive the magnification variable lens 102 so that the position of the magnification variable lens 102 can accord with the initial position of the magnification variable lens 102 set in S506 or S508.

Next, in S510, the camera MC 114 determines whether driving of the magnification variable lens 102 is completed, by determining whether the position of the magnification variable lens 102 detected by the zoom lens position detector 112 accords with the initial position of the magnification variable lens 102. The camera MC 114 returns to S509 and continues to drive the lens when determining that driving has not yet been completed. When determining that the driving has been completed, the camera MC 114 completes starting of the image pickup apparatus, and usual control processing of the image pickup apparatus follows.

As described above, when the power of the image pickup apparatus is turned off and is turned on later and when the magnification variable ring 117 is not manipulated, the magnification variable lens 102 is moved to the previous position of the magnification variable lens 102 which is stored when the power is previously turned off. Therefore, the shift of the image magnification caused by the positional shift of the magnification variation lens 102 can be prevented.

When the above control is applied to the focus ring instead of the magnification variable ring 117, a defocus problem caused by the positional shift of the focus lens 105 can be prevented.

The processing of FIG. 4 may be performed when the manipulation of the magnification variable ring 117 is switched from the valid state to the invalid state, and the processing of FIG. 5 may be performed when the manipulation of the magnification variable ring 117 is switched from the invalid state to the valid state. In this case, when the manipulation of the magnification variable ring 117 is switched from the invalid state to the valid state and when the magnification variable ring 117 is not manipulated, the magnification variable lens 102 is moved to the previous position of the magnification variable lens 102 which is stored when the manipulation of the magnification variable ring 117 is previously switched from the valid state to the invalid state. The manipulation of the magnification variable ring 117 is made invalid, for example, when a key manipulation can also provide the magnification variation, the photographer can select either the magnification variable ring 117 or the key manipulation for the magnification variation manipulation, and the photographer selects the key manipulation. In addition, since the magnification variation manipulation is unnecessary when the recorder 109 is reproduced so as to display the data on the monitor unit 115, the camera MC 114 provides control so as to invalidate the magnification variation manipulation of the magnification variable ring 117.

Second Embodiment

Figure 6:
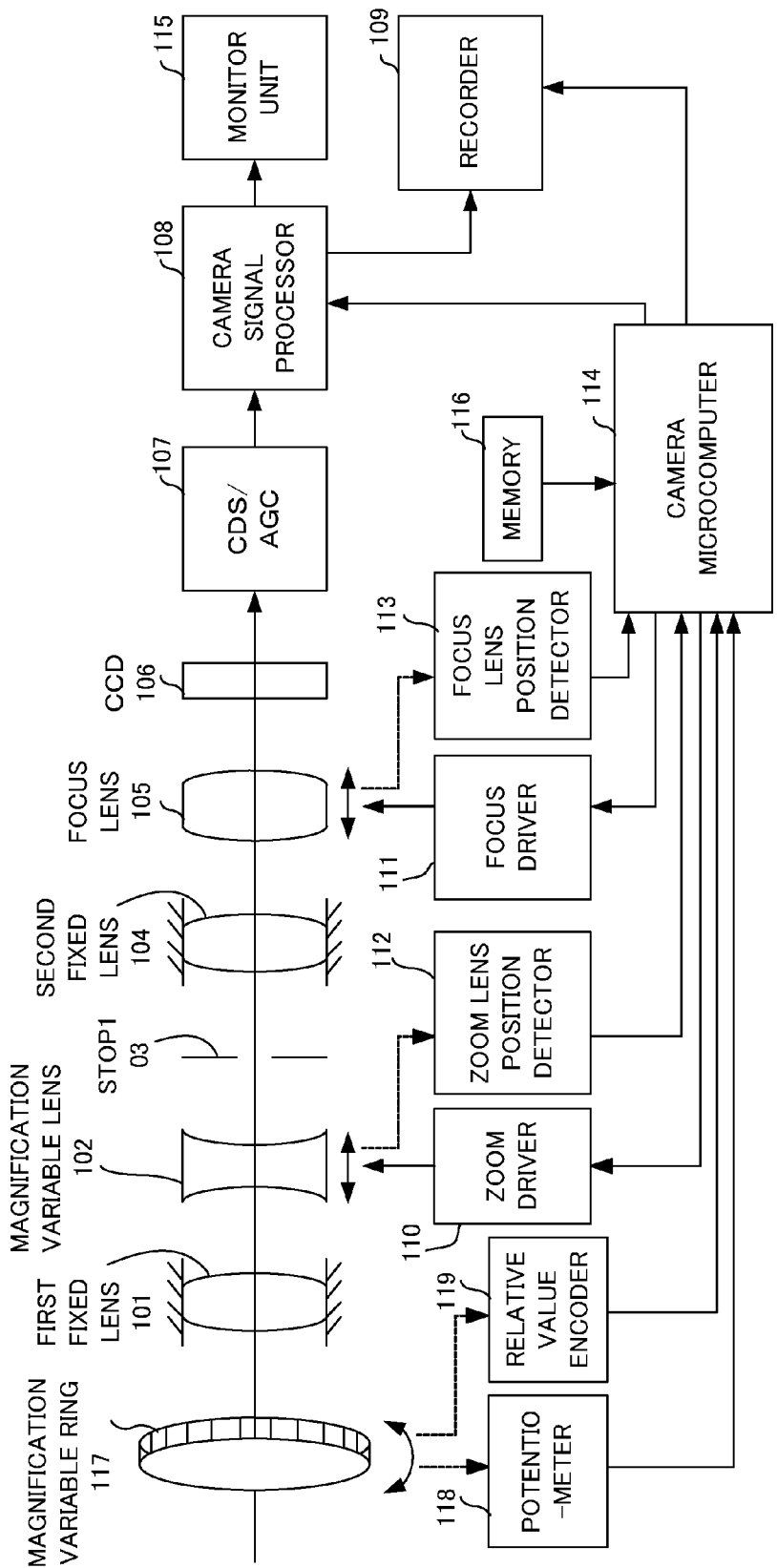
FIG. 6 is a block diagram of an image pickup apparatus according to a second embodiment.

FIG. 6 is a block diagram of the image pickup apparatus of the second embodiment, and those elements designated by the reference numerals 101 to 118 are the same as those of the first embodiment.

Reference numeral 119 is a relative position detector configured to detect a relative position (rotating angle) of the magnification variation ring 117, and includes a relative value encoder. An output of the relative value encoder 119 is input into the camera MC 114. The relative value encoder 119 can utilize a type configured to output ON and OFF pulses whenever the ring rotates by a predetermined angle, and a type configured to output voltage that periodically changes for each predetermined angle. An example of the former type is a photo-interrupter, and an example of the latter type is an MR device.

Among the relative value encoders, the encoder that utilizes the MR device, in particular, has position detecting precision higher than the absolute value encoder, such as a potentiometer. Therefore, rather than calculating the position of the magnification variable lens 102 utilizing Expressions 1 and 3 and the output of the potentiometer 118, the position can be obtained with finer resolution and improved operability. However, the relative value encoder can provide only a relative position of the magnification variable ring 117 and it is thus necessary to utilize the potentiometer 118 to detect the absolute position of the magnification variable ring 117.

Figure 7A:
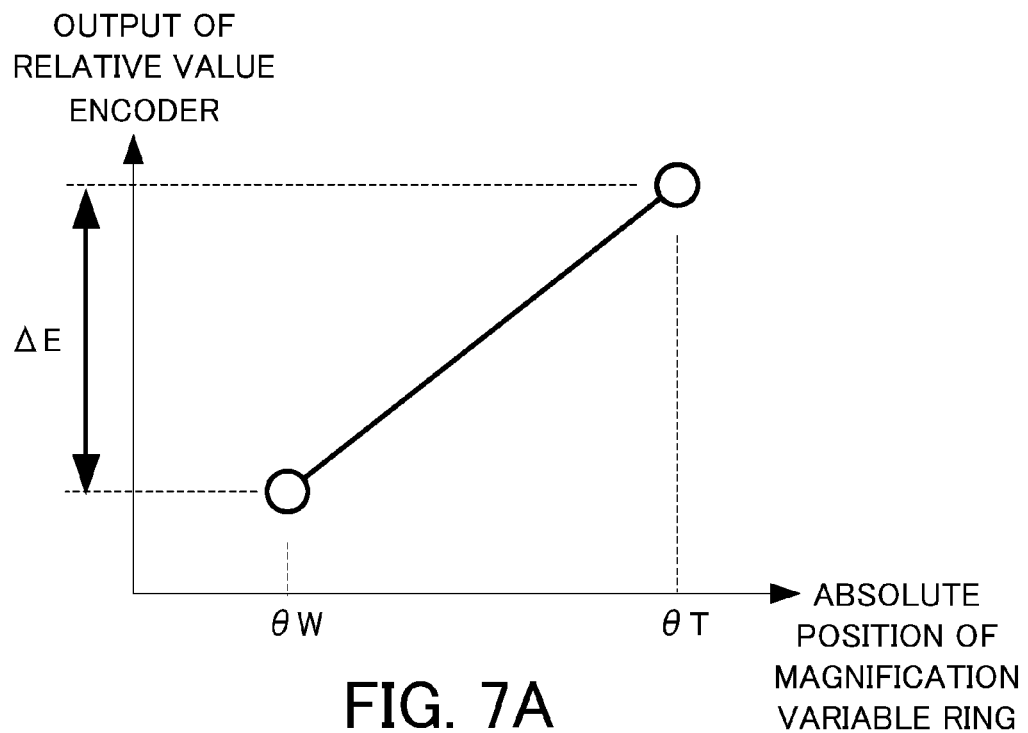
FIGS. 7A and 7B are graphs illustrating a relationship among an absolute position of a magnification variable ring, an output of a relative value encoder, and a position of a magnification variable lens illustrated in FIG. 1.

FIG. 7A is a graph illustrating a relationship between the absolute position of the magnification variation ring 117 and an output of the relative value encoder 119. Assume that $\Delta E$ denotes an output difference of the relative value encoder corresponding to a rotating angle from the wide angle end stopper position to the telephoto end stopper position of the magnification variable ring 117. In the relative value encoder 119, the encoder values of the wide angle end and the telephoto end of the magnification variable ring 117 are not fixed but the difference $\Delta E$ is constant.

Figure 7B:
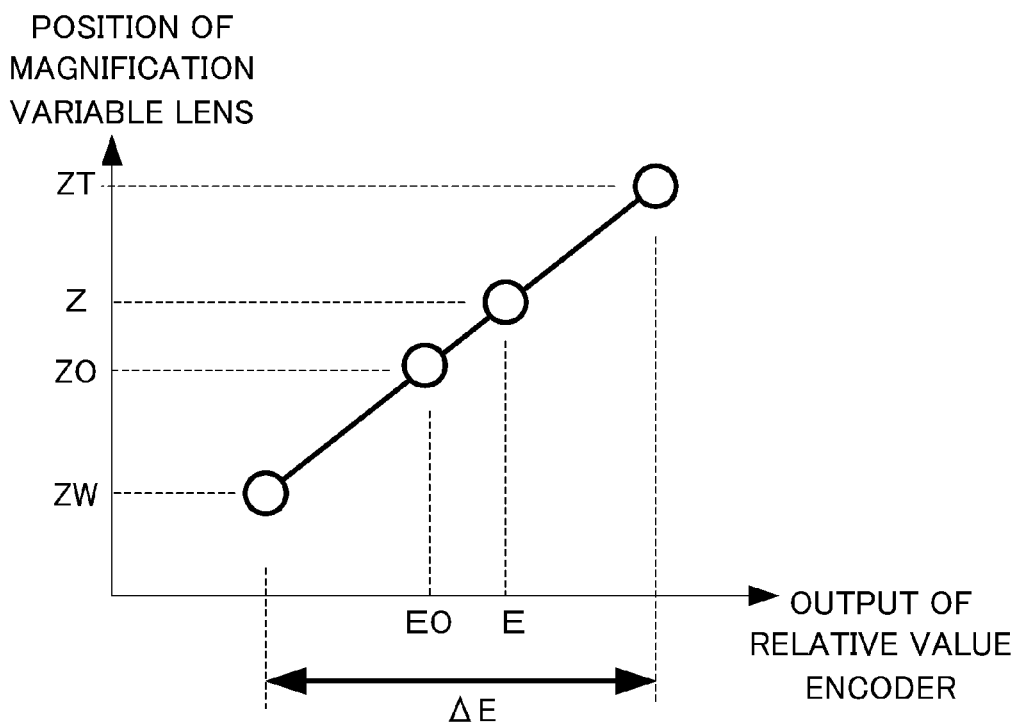

FIG. 7B is a graph illustrating a relationship between an output of the relative value encoder 119 and a position of the magnification variable lens 102. Although the relative value encoder 119 cannot detect the absolute position of the magnification variable lens 102, the position Z of the magnification variable lens 102 when the encoder value is E can be calculated by determining the initial value E0 of the encoder value and the initial position Z0 of the magnification variable lens 102 when the image pickup apparatus is started and by utilizing the following expression:

$$Z=(ZT-ZW)\times(E-E0)/\Delta E+Z0 \quad (4)$$

The initial value E0 of the encoder value can be set to an arbitrary value that is convenient for the control calculation. On the other hand, the initial position Z0 of the magnification variable lens 102 may use the initial position of the magnification variable lens 102 determined in S506 and S508 in FIG. 5 by executing processing similar to that of FIGS. 4 and 5 described in the first embodiment. As described above, the position of the magnification variable lens 102 can be calculated from the output of the relative value encoder 119 by utilizing Expression 4, by determining E0 and Z0, and by initializing the operational expression.

Since the second embodiment executes the processing of FIGS. 4 and 5 similar to the first embodiment, the positional shift of the magnification variable lens 102 can be prevented when the power of the image pickup apparatus is turned off and later turned on. Thereafter, the camera MC 114 controls the zoom driver 110 so as to move the magnification variable lens 102 without utilizing the potentiometer 118 but utilizing as the initial position the position of the magnification variable lens 102 corresponding to the position of the magnification variable ring 117 detected by the relative value encoder 119. Then, the camera MC 114 controls lens driving based on Expression and the output of the relative value encoder 119 instead of Expressions 1 to 3, providing more precise magnification variable manipulation.

Similar to the first embodiment, the above processing is applicable to control of the focus lens 105 utilizing the focus ring. Moreover, similar to the first embodiment, the above processing may be executed when the manipulation of the magnification variable ring 117 is switched from the valid state to the invalid state or from the invalid state to the valid state.

Third Embodiment

Next follows an embodiment that utilizes an image pickup lens that is an exchange lens type.

Figure 8:
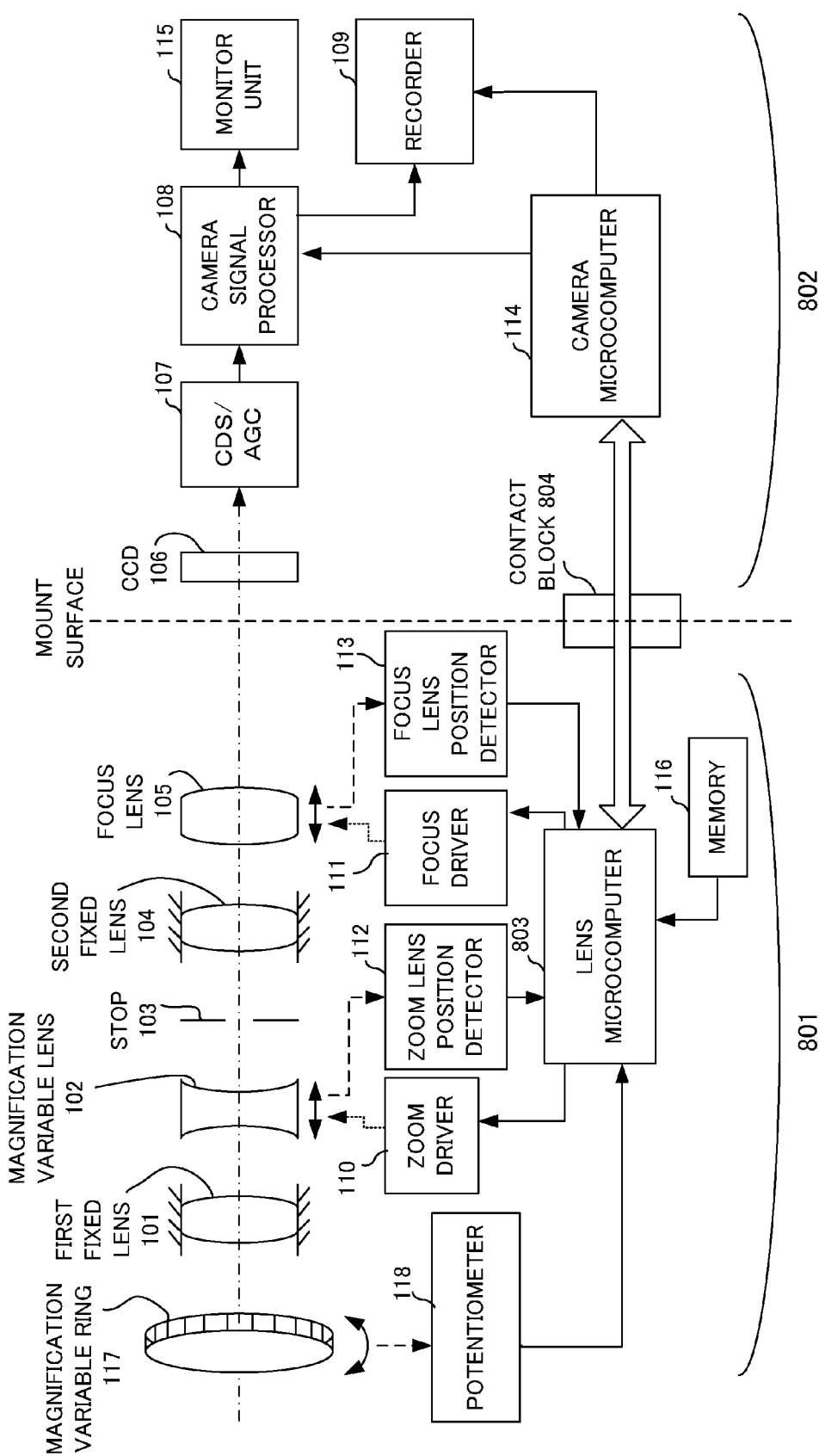
FIG. 8 is a block diagram of an image pickup apparatus according to a third embodiment.

FIG. 8 illustrates a structure of the image pickup lens and the image pickup apparatus body. In this embodiment, an image pickup lens 801 is detachably attached to an image pickup apparatus body 802. The image pickup lens 801 includes a microcomputer (lens MC) 803 configured to control the lens, and the zoom driver 110 and the focus driver 111 are controlled by the lens MC 803. The outputs of the zoom lens position detector 112, the focus lens position detector 113, and the potentiometer 118 are input into the lens MC 803. Those elements 101 to 118 are the same as those of the first embodiment, and a description thereof will be omitted.

The lens MC 803 and the MC (camera MC) 114 can transmit data via a contact block 804 provided on a mount surface between the image pickup lens 801 and the image pickup apparatus body 802. The data communication is executed for each period, such as a generation period of a vertical synchronizing signal of a video signal, and lens position data, data representing a lens control state, etc., are transmitted from the lens MC 803 to the camera MC 114. On the other hand, for example, manipulation information of a zooming key (not illustrated), autofocus or auto-exposure signal information obtained by camera signal processing, etc. are transmitted from the camera MC 114 to the lens MC 803.

In the above structure, when the MC 803 executes the lens driving control processing that is executed by the camera MC 114 in the first embodiment, the control similar to that of the first embodiment can be realized in the image pickup lens 801. Thereby, similar to the first embodiment, the camera configuration in which the image pickup lens is detachably attached to the camera body can solve a problem in which an image magnification shifts due to the shift of the zoom lens position.

Fourth Embodiment

Next follows an embodiment that uses an image pickup lens that is an exchange lens type and inputs to the lens MC 803 an output of the relative value encoder configured to detect a relative position (rotating angle) of the magnification variable ring 117.

Figure 9:
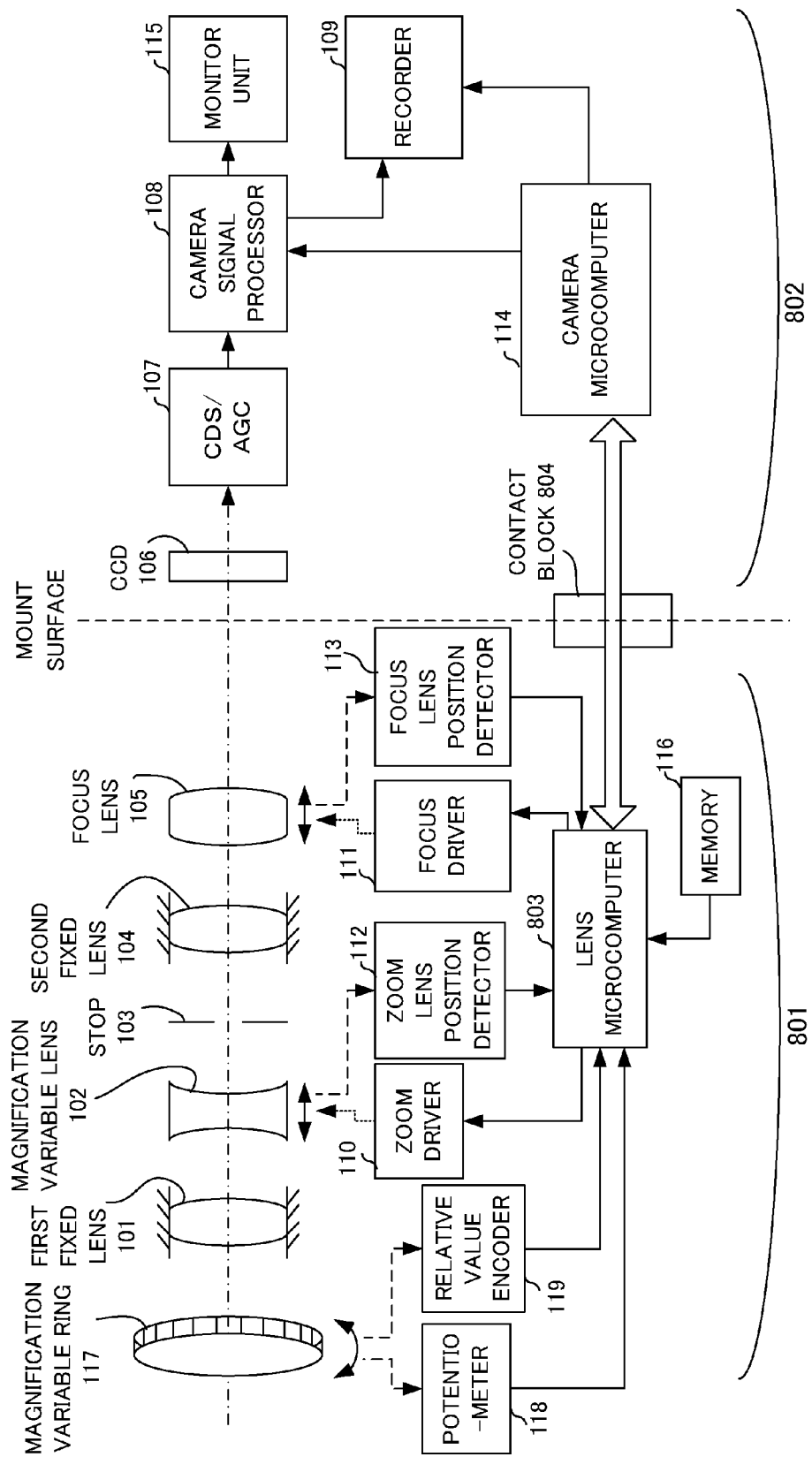
FIG. 9 is a block diagram of an image pickup apparatus according to a fourth embodiment.

FIG. 9 illustrates a structure of the image pickup lens and the image pickup apparatus body. Even in this embodiment, similar to the above third embodiment, the image pickup lens 801 is detachably attached to the image pickup apparatus body 802. Those elements 101 to 118 and 801 to 804 are the same as those of the third embodiment, and a description thereof will be omitted. Reference numeral 119 denotes a relative value encoder similar to that of the second embodiment, and its output is input into the lens MC 803. In the fourth embodiment having this structure, the lens MC 803 controls lens driving which is executed by the camera MC 114 in the second embodiment. Thereby, the image pickup lens 801 can provide control similar to that in the second embodiment.

The fourth embodiment can solve a problem of a shift of the image magnification caused by a shift of the zoom lens position, and control lens driving based on the highly precise relative value encoder's outputs, providing more precise zoom manipulations.

The flowcharts illustrated in FIGS. 4 and 5 can be implemented as a program executable by the processor (computer).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The image pickup apparatus can be applied to imaging of the object.

This application claims the benefit of Japanese Patent Application No. 2010-071632, filed Mar. 26, 2010, which is hereby incorporated by reference herein in its entirety.

What is claimed is:

1. An image pickup lens comprising:
an optical system including a lens;
a controller configured to control a movement of the lens in an optical axis direction;
a lens position detector configured to detect a position of the lens;
a manipulator configured to accept a manipulation used to move the lens; and
a manipulator position detector configured to detect a position of the manipulator,
wherein the controller has a manipulator valid mode of controlling the movement of the lens according to the position of the manipulator and a manipulator invalid mode of controlling the movement of the lens not according to the position of the manipulator, and
wherein, in the manipulator valid mode, in a case that a difference between the position of the manipulator when the manipulator invalid mode was started and the position of the manipulator when the manipulator valid mode was started is equal to or smaller than a threshold, the controller is configured to set an initial position of the movement of the lens to the position of the lens detected by the lens position detector when the manipulator invalid mode was started to control the movement of the lens, and in a case that the difference is larger than the threshold, the controller is configured to set the initial position of the movement of the lens to the position of the lens which corresponds to the position of the manipulator detected by the manipulator position detector to control the movement of the lens.

2. The image pickup lens according to claim 1, wherein the lens includes at least one of a magnification variable lens configured to change a focal length of the optical system and a focus lens configured to provide focusing on an object.

3. An image pickup lens according to claim 1, wherein the manipulator includes a first member having a ring shape and a second member different from the first member, and
wherein the manipulator invalid mode is started when a user selects the second member.

4. An image pickup lens according to claim 1, wherein the manipulator invalid mode is started when an object image is displayed on a monitor unit.

5. The image pickup lens according to claim 1, further comprising a relative position detector configured to detect a relative position of the manipulator, wherein the controller is configured to move the lens from the initial position based on the relative position detected by the relative position detector.

6. The image pickup lens according to claim 5, wherein detecting accuracy of the relative position detector is higher than that of the manipulator position detector.

7. An image pickup apparatus comprising:
a lens position detector configured to detect a position of a lens;
a manipulator position detector configured to detect a position of a manipulator configured to accept a manipulation used to move the lens;

a controller configured to control a movement of the lens, and has a manipulator valid mode according to the position of the manipulator and a manipulator invalid mode of controlling the movement of the lens not according to the position of the manipulator; and a memory configured to store the position of the manipulator detected by the manipulator position detector and the position of the lens detected by the lens position detector when the manipulator invalid mode is started, wherein, in the manipulator valid mode, in a case that a difference between the position of the manipulator when the manipulator invalid mode was started and the position of the manipulator when the manipulator valid mode was started is equal to or smaller than a threshold, the controller is configured to set an initial position of the movement of the lens to the position of the lens when the manipulator invalid mode was started to control the movement of the lens, and in a case that the difference is larger than the threshold, the controller is configured to set the initial position of the movement of the lens to the position of the lens which corresponds to the position of the manipulator detected by the manipulator position detector to control the movement of the lens.

8. The image pickup apparatus according to claim 7, wherein the lens includes at least one of a magnification variable lens configured to change a focal length of the optical system and a focus lens configured to provide focusing on an object.

9. An image pickup apparatus according to claim 7, wherein the manipulator includes a first member having a ring shape and a second member different from the first member, and wherein the manipulator invalid mode is started when a user selects the second member.

10. An image pickup apparatus according to claim 7, wherein the manipulator invalid mode is started when an object image is displayed on a monitor unit.

11. The image pickup apparatus according to claim 7, further comprising a relative position detector configured to detect a relative position of the manipulator, wherein the controller is configured to move the lens from the initial position based on the relative position detected by the relative position detector.

12. The image pickup apparatus according to claim 11, wherein detecting accuracy of the relative position detector is higher than that of the manipulator position detector.

13. A lens controlling method comprising:

a first step of controlling a movement of a lens according to a position of a manipulator configured to accept a manipulation used to move a lens; and a second step of controlling the movement of the lens not according to the position the manipulator, wherein the first step including the steps of:

setting an initial position of the movement of the lens to the position of the lens of when the second step was started to control the movement of the lens, in a case that a difference between the position of the manipulator when the second step was started and the position of the manipulator when the first step is started is equal to or smaller than a threshold; and setting the initial position of the movement of the lens to the position of the lens which corresponds to the position of the manipulator to control the movement of the lens, in the case that the difference is larger than the threshold.

14. An image pickup lens, comprising:

an optical system including a lens;

a lens position detector configured to detect a position of the lens;

a manipulator manipulated so as to instruct driving of the lens;

a controller configured to control the driving of the lens in an optical axis direction based on a manipulation of the manipulator to instruct the driving of the lens when power is turned on or when a mode that is allowed to drive the lens according to the manipulation of the manipulator is selected; and a manipulator position detector configured to detect a manipulation position where the manipulator is manipulated, wherein, when power becomes turned on or the manipulation of the manipulator becomes valid, the controller is configured to set the initial position of the movement of the lens based on the position of the manipulator when the power becomes turned on or the manipulation of the manipulator becomes valid and the position of the lens detected by the lens position detector when the power is turned off or the manipulation of the manipulator is invalid.

15. The image pickup lens according to claim 14, wherein the lens includes at least one of a magnification variable lens configured to change a focal length of the optical system and a focus lens configured to provide focusing on an object.

16. The image pickup lens according to claim 14, when power becomes turned on or the manipulation of the manipulator becomes valid, the controller is configured to set the initial position of the movement of the lens based on a difference between the position of the manipulator when the power is turned off or the manipulation of the manipulator is invalid and the position of the manipulator when the power becomes turned on or the manipulation of the manipulator becomes valid and the position of the lens detected by the lens position detector when the power is turned off or the manipulation of the manipulator is invalid.

17. The image pickup lens according to claim 14, further comprising a relative position detector configured to detect a manipulation amount of the manipulator, wherein the controller is configured to control the driving of the lens based on the manipulation amount of the manipulator that is detected by the relative position detector.

18. The image pickup lens according to claim 17, wherein detecting accuracy of the relative position detector is higher than that of the manipulator position detector.

19. An image pickup apparatus comprising:

a lens position detector configured to detect a position of a lens;

a manipulator position detector configured to detect a manipulation position of a manipulator manipulated so as to instruct driving of the lens;

a memory configured to store the manipulation position of the manipulator detected by the manipulator position detector and the position of the lens detected by the lens position detector when power is turned off or a mode that is not allowed to drive the lens according to the manipulation of the manipulator is selected; and a controller, wherein, when power becomes turned on or the manipulation of the manipulator becomes valid, the controller is configured to set the initial position of the movement of the lens based on the position of the manipulator when the power becomes turned on or the manipulation of the manipulator becomes valid and the position of the lens detected by the lens position detector when the power is turned off or the manipulation of the manipulator is invalid.

20. The image pickup apparatus according to claim 19, wherein the lens includes at least one of a magnification variable lens configured to change a focal length of the optical system and a focus lens configured to provide focusing on an object.

21. The image pickup apparatus according to claim 19,
when power becomes turned on or the manipulation of the manipulator becomes valid,
the controller is configured to control the movement of the lens based on a difference between the position of the manipulator when the power is turned off or the manipulation of the manipulator is invalid and the position of the manipulator when the power becomes turned on or the manipulation of the manipulator becomes valid and the position of the lens detected by the lens position detector when the power is turned off or the manipulation of the manipulator is invalid.

22. The image pickup apparatus according to claim 19, further comprising a relative position detector configured to detect a manipulation amount of the manipulator,
wherein the controller is configured to control the driving of the lens based on the manipulation amount of the manipulator that is detected by the relative position detector.

23. The image pickup apparatus according to claim 22, wherein detecting accuracy of the relative position detector is higher than that of the manipulator position detector.

24. A lens controlling method, the method comprising:
setting, when power becomes turned on or a manipulation of a manipulator that configured to accept the manipulation used to move a lens becomes valid, the initial position of the movement of the lens based on the position of the manipulator when the power becomes turned on or the manipulation of the manipulator becomes valid and the position of the lens detected by the lens position detector when the power is turned off or the manipulation of the manipulator is invalid.

* * * * *